(12) United States Patent
Johnson, Jr. et al.

(10) Patent No.: US 11,009,342 B2
(45) Date of Patent: May 18, 2021

(54) HARDNESS AND FLATNESS TESTER

(71) Applicant: STEPAN COMPANY, Northfield, IL (US)

(72) Inventors: Thomas K. Johnson, Jr., Chicago, IL (US); David J. Norberg, Grayslake, IL (US); Daniel Yocius, Western Springs, IL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 16/640,556

(22) PCT Filed: Aug. 3, 2018

(86) PCT No.: PCT/US2018/045221
§ 371 (c)(1),
(2) Date: Feb. 20, 2020

(87) PCT Pub. No.: WO2019/040262
PCT Pub. Date: Feb. 28, 2019

(65) Prior Publication Data
US 2020/0217652 A1    Jul. 9, 2020

Related U.S. Application Data

(60) Provisional application No. 62/549,766, filed on Aug. 24, 2017.

(51) Int. Cl.
| | | |
|---|---|---|
| *G01N 21/00* | (2006.01) | |
| *G01B 11/25* | (2006.01) | |
| B29C 44/60 | (2006.01) | |
| *G01B 11/06* | (2006.01) | |
| *G01B 11/22* | (2006.01) | |

(Continued)

(52) U.S. Cl.
CPC .......... *G01B 11/2522* (2013.01); *B29C 44/60* (2013.01); *G01B 11/0608* (2013.01);
(Continued)

(58) Field of Classification Search
CPC .................. H01J 37/32935; G01J 3/02; G01N 2015/1037; G01N 21/64; G01N 21/68
(Continued)

(56) References Cited

U.S. PATENT DOCUMENTS 4,965,452 A    10/1990 Sturm
5,352,510 A    10/1994 Laughlin et al.
(Continued)

FOREIGN PATENT DOCUMENTS

JP    S58111708    7/1983

OTHER PUBLICATIONS

PCT International Search Report for PCT Patent Application No. PCT/US2018/045221 dated Oct. 11, 2018.
(Continued)

*Primary Examiner* — Md M Rahman
(74) *Attorney, Agent, or Firm* — McAndrews, Held & Malloy, Ltd.

(57) ABSTRACT

Methods and systems for determining the integrity of a manufactured board are disclosed. An example system includes a testing platform configured to secure the manufactured board, a sensor configured to measure a parameter corresponding to a flatness of a surface of the board, and a controller. The controller is configured to identify regions on the surface corresponding to one of a peak or a valley based on the parameter, and calculate a score representing the integrity of the manufactured board based on the identified peaks and valleys. The controller adjusts a flow rate, a pressure, a temperature, and position of a deposited substance in a manufacturing process based on a comparison with a height of the peak and/or a depth of the valley to stored peak heights and/or valley depths. In some examples, a mechanical tester determines a compressive strength and a density of the board at the identified regions.

18 Claims, 3 Drawing Sheets

(51) Int. Cl.
 *G01B 11/30* (2006.01)
 *G01B 17/08* (2006.01)
(52) U.S. Cl.
 CPC ............ *G01B 11/22* (2013.01); *G01B 11/306* (2013.01); *G01B 17/08* (2013.01)
(58) Field of Classification Search
 USPC ........................................................ 356/72
 See application file for complete search history.

(56) References Cited

U.S. PATENT DOCUMENTS

| | | | |
|---|---|---|---|
| 8,521,443 B2* | 8/2013 | Vichare ................. | G06F 11/008 702/34 |
| 2004/0185662 A1 | 9/2004 | Fujisawa et al. | |
| 2013/0002444 A1 | 1/2013 | Bitzel, Jr. | |
| 2014/0300574 A1* | 10/2014 | Benkley, III ............. | G06K 9/52 345/174 |

OTHER PUBLICATIONS

PCT Written Opinion for PCT Patent Application No. PCT/US2018/045221 dated Oct. 11, 2018.
Molleda, et al., "On-Line Flatness Measurement in the Steelmaking Industry", Sensors 2013, 13. Published Aug. 9, 2013. Department of Computer Science and Engineering, University of Oviedo, E-33204 Gijon, Spain.
European communication reporting the EESR Appln No. 18847883 dated Jan. 14, 2021.

* cited by examiner

HARDNESS AND FLATNESS TESTER

CROSS-REFERENCE TO RELATED APPLICATIONS

This application claims priority to U.S. Provisional Application No. 62/549,766, filed Aug. 24, 2017. The entire specification of the provisional application referred to above is hereby incorporated by reference.

BACKGROUND OF THE INVENTION

The present technology relates to methods and apparatuses to test hardness and/or flatness of a manufactured board. In particular, the present disclosure describes a testing platform capable of measuring the flatness of the manufactured board, identifying regions having peaks and valleys outside an acceptable threshold, and testing the compressive strength and/or density of the board at the identified regions.

Aromatic polyester polyols can be used in rigid board-stock polyurethane and polyisocyanurate foams, which can improve mechanical properties, fire performance, and insulation value. Aromatic polyester polyols are designed for the requirements of polyurethane and polyisocyanurate board-stock foam, where a fine cell structure and premium mechanical properties are required.

Some manufacturing techniques, such as those intended to reduce costs of manufacturing foam insulation paneling, have resulted in non-uniformly flat surfaces with a degraded appearance and/or integrity. Conventional methods to measure the flatness of a foam board are manual, labor-intensive, and prone to operator error. Such methods are also limited to a small number of measurement locations on the board. The result is a slow, resource intensive process that often fails to provide a complete assessment of the board's flatness and integrity.

Based on the deficiencies of the current techniques, a more efficient, more complete method and apparatus to test the integrity of a manufactured board is desirable.

SUMMARY OF THE INVENTION

In one aspect, this disclosure provides a testing system for determining the integrity of a manufactured board. The system includes a testing platform configured to secure the manufactured board, a sensor configured to measure a parameter corresponding to a flatness of a surface of the board, and a controller. The controller is configured to identify regions on the surface corresponding to one of a peak or a valley based on the parameter, as well as calculate a score representing the integrity of the manufactured board based on the identified peaks and valleys.

In a further aspect, this disclosure provides a method of determining the integrity of a manufactured board. The method includes measuring, by a sensor, a parameter corresponding to a flatness of a surface of the board, identifying, at a controller, regions on the surface corresponding to one of a peak or a valley based on the parameter, and calculating, by the controller, a score representing the integrity of the board based on the number of identified peaks and valleys.

In some examples, the testing system includes a mechanical tester configured to determine one of a compressive strength and a density of the board at the identified regions.

In disclosed examples, the method further includes comparing the height of a peak and/or the depth of a valley to stored peak heights and/or valley depths corresponding to operating values, and adjusting an operating value of a board manufacturing process based on the comparison.

BRIEF DESCRIPTION OF THE DRAWINGS

The figures are not necessarily to scale. Where appropriate, similar or identical reference numbers are used to refer to similar or identical components.

DETAILED DESCRIPTION OF THE PREFERRED EMBODIMENTS

Figure 1:
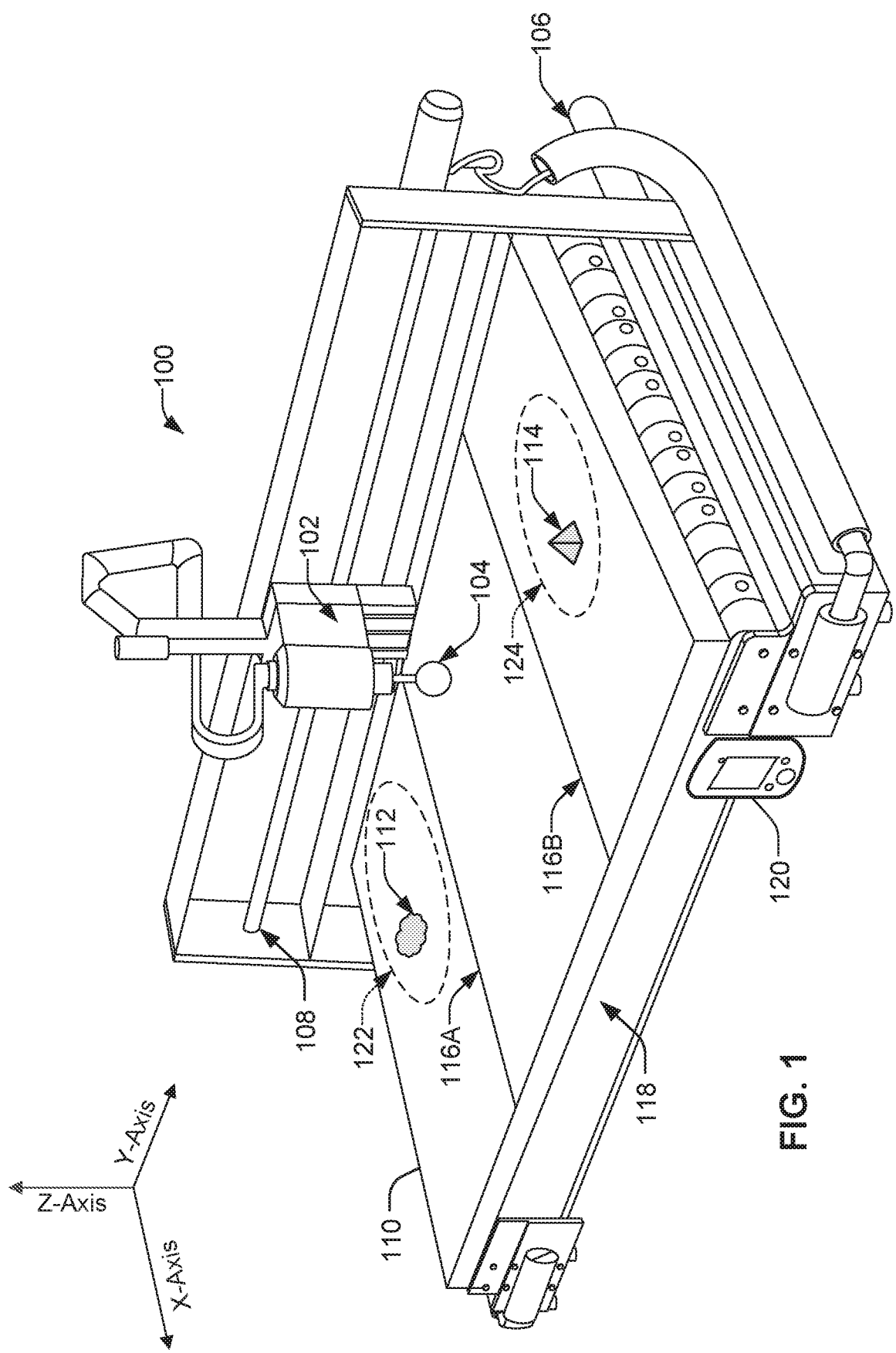
FIG. 1 shows an example testing system for determining the integrity of a manufactured board in accordance with aspects of this disclosure.

The present technology relates to methods and apparatuses to test the integrity (e.g., flatness and/or hardness) of a manufactured board (e.g., a foam insulation board). In particular, disclosed is a testing system that employs a computer numerical control (CNC) tester for measuring a flatness of a surface of the foam insulation board, such as by a laser scan.

The flatness of a manufactured board is of increasing importance as foam densities have decreased, due to, for example, a desire to limit the amount of resources needed to produce such a board. The result of applications employing such a board can include lower insulation performance, water accumulation, membrane adhesion failure, and decreased compressive strength. Conventional methods of determining the flatness of a board would use manual techniques to measure a limited portion of the finished board. The results of such a limited test would be used to determine the integrity of the entire board, and in some cases, the lot of boards represented by the tested sample board. Such a manual process is time and resource intensive, and the results are not representative of the integrity of the entire board or lot of boards.

By contrast, the testing system described herein employs a CNC tester and a laser scan to determine the flatness of the board surface. The flatness data is used to identify regions defined by peaks and valleys (e.g., a Z-axis deviation from the surface). The height of the peaks and the depth of the valleys are compared against one or more thresholds to determine regions as test locations in need of additional testing. The additional tests can include, but are not limited to, determining one or more of a thickness, a compressive strength, and a density of the board at the region. The test can be performed by a multi-directional, motorized testing device affixed to a motorized carriage capable of traversing the surface of the board (e.g., across an X-Y plane perpendicular to the Z-axis).

In some examples, the measuring device is used for measuring location specific physical properties of manufactured boards. Flatness can be measured by a laser scanner configured to scan the surface of the manufactured board for physical deviations. Based on the data collected during the scan, regions of the board that include peaks and valleys are determined. The identified regions are then tested for one or more physical properties, such as compressive strength. In an example, the compressive strength measuring device and motorized carriage are attached to a frame of the CNC tester, which can travel across the entire area of the board's surface and measure data specific to a selected location.

In some examples, the integrity of the board can be tested through an online process. In it, each board will progress through one or more service or test stations configured to measure the flatness of the board as it passes the station. For example, a laser scan can be oriented along an axis, such as the axis perpendicular to the axis of advancement. As the board advances through the testing station, the laser scanner can measure a depth associated with a valley, and a height associated with a peak. Based on this information, regions can be identified for further testing (e.g., for compressive strength testing), such as at a second testing station located along the online process.

Based on the data collected from the scan and/or the measuring device, a determination is made regarding the integrity of the board. For instance, a numerical score can be generated that represents the relative quality of the board corresponding to the determined integrity. Additionally or alternatively, a region or regions can be designated as having a low compressive strength. This information can be provided to a controller configured to respond to the determination (e.g., adjust an operating parameter of the manufacturing machinery, discard a board with a low score, etc.), or presented to an operator.

Additionally or alternatively, the manufacturing process for a foam board can result in "knit lines". For example, during manufacturing one or more nozzles are spaced along the width of the foam board, depositing fluid foam that spreads out and solidifies. The solidified foam is encased in an outer cover, which can form the surface to be scanned. In this example, knit lines form as fluid foam deposited from a first nozzle comes into contact with fluid foam from a second, adjacent nozzle. An indentation is formed at the interface as the fluid foam from the two nozzles solidifies, which can cause a measurable channel in the outer cover. In some examples, the manufacturing process can result in a peak and/or valley, as described above. Such peaks and/or valleys may be measurable through the outer cover, such as by use of a laser scanner.

By use of the methods and apparatuses described herein, the flatness measurement is automated, which serves to reduce the potential for operator errors, and is capable of taking thousands of accurate measurements. Thus, a more responsive manufacturing process is provided, and a more consistent and higher quality of manufactured boards results.

The presently described technology and its advantages will be better understood by reference to the following examples. These examples are provided to describe specific embodiments of the present technology. By providing these examples, the inventors do not limit the scope and spirit of the present technology.

FIG. 1 illustrates a CNC system 100. The CNC system 100 includes a measuring device 102 with a sensor 104 mounted thereon. The device 102 is configured to move about the system 100 by one or more rails, such as a first rail 108 along the Y-axis or lengthwise, and a second rail 106 along the X-axis or across the width of the system 100. A motor or other actuator can be incorporated with the measuring device 102 to move the device 102 along a Z-axis. Accordingly, the measuring device 102, and the sensor 104 mounted thereon, can navigate in three-dimensional space above the board. In some examples, the sensor 104 is mounted remotely from the measuring device 102. In some examples, the measuring device 102 includes additional test equipment, such as a mechanical tester (e.g., force sensor) and/or alternative testing device (e.g., infrared (IR), ultrasound, etc.) to measure a characteristic (e.g., thickness, compressive strength, density, etc.) of a manufactured board 110.

The CNC system 100 is computer-controlled, capable of navigating over an area associated with a testing platform 118. In some examples, the manufactured board 110 (e.g., a foam insulation board) can be positioned on the platform 118.

Measurements from the sensor 104 can be transmitted to a controller 120, via a wired or wireless channel. The controller 120 can use the measurements to identify deviations on the board 110, such as a depression or "valley" 112 and bump or "peak" 114. A valley 112 is determined by a measured distance below the surface of the board 110, whereas the peak is measured above the surface of the board 110.

The measured difference from the valley 112 and/or peak 114 can be compared against a list of threshold values stored with the controller 120. If the difference is within a suitable tolerance, the corresponding valley 112 and/or peak 114 will not be classified as a defect on the board 110 surface. However, if the measured height lies outside the tolerance level, the controller 120 will designate the regions 122 and/or 124 containing the valley 112 and/or the peak 114 for further testing, such as by the measuring device 102.

One or more knit lines 116A, 116B can be formed on the board 110 during the manufacturing process. These knit lines 116A, 116B may result in a measurable channel in the surface of the board 110, the depth of which can be compared against a list of knit line threshold values stored with the controller 120. Provided the depth of the knit lines 116A, 116B are within a suitable tolerance, they will not be classified as a defect in the board's surface. However, if the depth of the knit lines 116A, 116B is outside a suitable tolerance, the location of the depth will be identified as residing in a region for further testing.

Based on information provided by the sensor 104, the controller 120 generates coordinates to direct the measuring device 102 to the identified regions 122, 124. As provided above, additional testing can be performed. In some examples, the system 100 can be controlled by manually programming the controller 120, including modification to the threshold values, as well as directing the sensor 104 or the testing device to a desired location on the board 110.

In some examples, a testing platform can be integrated into an online manufacturing process. An online process is characterized by a continuous flow of completed boards through one or more service or test stations. For example, a conveyor system can advance a completed board to a testing station. The testing station can be configured to measure the flatness of the board as it passes the station, such as by a laser scan. In such a case, the laser scan can be oriented along a single axis, such as the axis perpendicular to the axis of advancement. As the board advances through the testing station, the laser scanner can measure a depth associated with a valley, and a height associated with a peak. Based on this information, regions can be identified for further testing (e.g., for compressive strength testing), as described herein.

For boards that require additional testing, a second testing station can be located along the conveyor system. Coordinates can be provided to one or more devices at the second testing station to locate the regions that have been identified as requiring additional testing. The additional testing can be conducted by a CNC tester as described with respect to FIG. 1. Additionally or alternatively, compressive strength can be measured manually, with non-invasive testing apparatuses (e.g., IR scan, ultrasound, etc.), or another measurement device. In some examples, the conveyor system can direct boards that require additional testing to the second testing station, whereas boards without identified defects advance to a finishing and/or packaging area.

Based on the results from the laser scan and/or the compressive strength testing, one or more parameters of the manufacturing system can be adjusted to correct measured defects. Non-limiting examples include the temperature of the applied material, the flowrate pressure, the deposition volume, and/or the position of the board on the manufacturing line, which can be adjusted to mitigate the presence of defects in the completed boards. In some examples, the board can be given a quality score, with an alert being provided to a user, the board being marked, or other suitable method.

Figure 2:
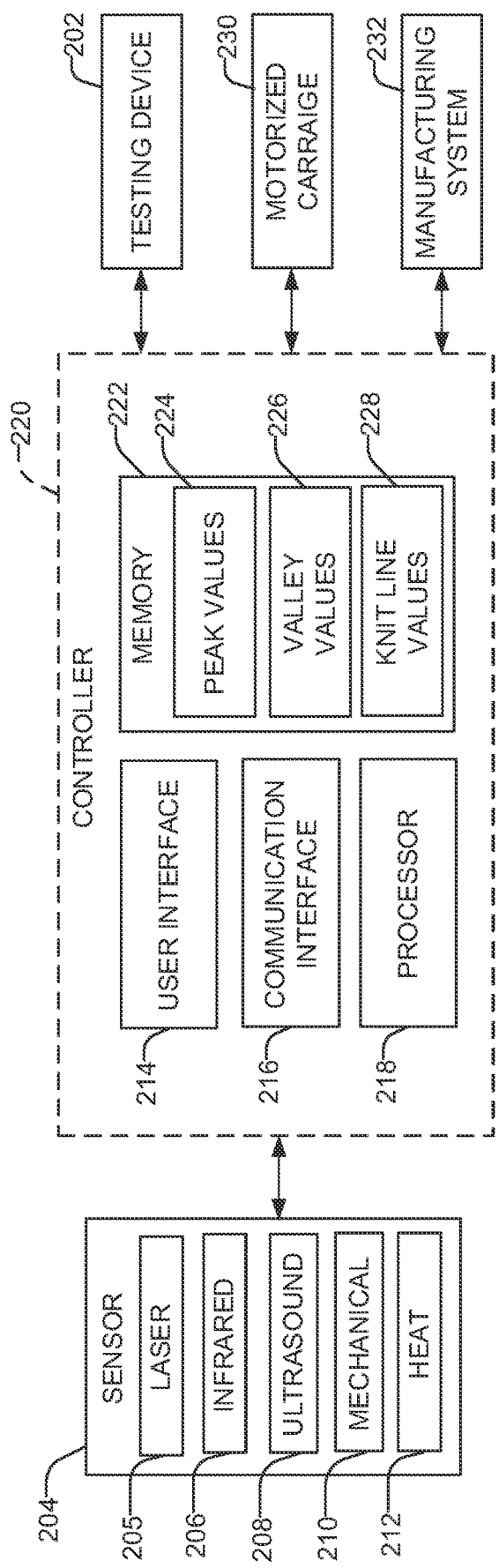
FIG. 2 is a block diagram of an example controller for a testing system in accordance with aspects of this disclosure.

FIG. 2 shows a block diagram of an example implementation of a controller 220. The controller 220 can be of a type to operate as the controller 120 of FIG. 1. The controller 220 includes a communication interface 216 to transmit information to and receive information from one or more devices and/or components. The interface 216 is operatively connected to a user interface 214, a processor 218, a memory 222, as well as a sensor 204, a testing device 202, a motorized carriage 230, and a manufacturing system 232. The sensor 204 can include one or more of a laser scanner 205, an IR sensor 206, an ultrasound sensor 208, a mechanical sensor 210, and a heat sensor 212.

The example controller 220 of FIG. 2 includes processor 218 capable of executing computer readable instructions, and may be a general-purpose computer, a laptop computer, a tablet computer, a mobile device, a server, and/or any other type of computing device integrated or remote to the system 100. In some examples, the controller 220 is implemented in a cloud computing environment, on one or more physical machines, and/or on one or more virtual machines.

The memory 222 contains a matrix or other listing of peak height values 224, a matrix or other listing of valley depth values 226, as well as a matrix or other list of knit line values 228. Each of these values 224-228 correspond to threshold values for acceptable deviations from the flat surface of a manufactured board, such as board 110. For example, the controller 220 is configured to access the memory 222 storing the lists of values 224, 226, 228. In some examples, the controller 220 and the memory 222 are integrally located (e.g., within a computing device). In some examples, the controller 220 is connected to a network interface to access the lists of values 224, 226, 228 via a communications network.

In some examples, the memory device 222 or another memory device may include volatile or non-volatile memory, such as ROM, RAM, magnetic storage memory, optical storage memory, or a combination thereof, and may be integrated with the controller 220, located remotely, or a combination of the two. In addition, a variety of control parameters (e.g., for operating the sensor 204, the testing device 202, the motorized carriage 230, and the manufacturing system 232) may be stored in the memory device 222 along with code configured to provide a specific output during operation of the system 100.

The controller 220 is configured to receive one or more measurements to determine the integrity of a board. For example, the sensor 204 scans the board to identify peaks and valleys on the surface of the board and measure their heights and depths relative to the board surface, respectively. The information is sent to the controller 220, which may utilize a look up table, an algorithm, and/or a model stored in the memory device 222 to determine the integrity of the board based on a relationship between the peaks and valleys and the values stored in memory 222. For example, the controller 220 compares the measured height of the peaks against the peak values 224 stored in the memory 222 to determine if the height is outside a suitable threshold. Similarly, the depth of the valley and the knit lines are compared against the values in the lists 226 and 228, respectively.

Based on the comparison, the controller 220 can determine whether additional testing is required. If so, the controller 220 sends coordinates to drive the motorized carriage 230 to the identified region and controls the testing device 202 to perform additional testing (e.g., a compressive strength test). Accordingly, the testing device 202 can provide information regarding any defect, which can be compiled, along with information on the peak and valley measurements, to generate a score, an alert, or instructions for modification to the manufacturing system 232.

In an example, the controller 220 determines a type and severity of a defect in the board 110, and provides the information to the manufacturing system 232. One or more operating values (e.g., a flow rate, a pressure, a temperature, position of a deposited substance, position of the stream, conveyor speed, etc.) of the manufacturing system 232 can then be adjusted to ensure the defect is corrected through the manufacturing process.

Based on the collected measurements, any adjustment required to an operating value can be determined empirically. In some examples, the controller 220 is configured to interpolate a correction to an operating value. The operating value can then be adjusted to correct the defect, as described herein. The controller 220 may calculate, employ an algorithm, a model stored in the memory device 222, or apply one or more machine-learning techniques to determine a desired adjustment.

Additionally or alternatively, the controller 220 may receive input from the user interface 214 configured for inputting commands and/or customizing controls (e.g., via graphical user interfaces (GUI), touch screens, communication pathways, etc.).

Figure 3:
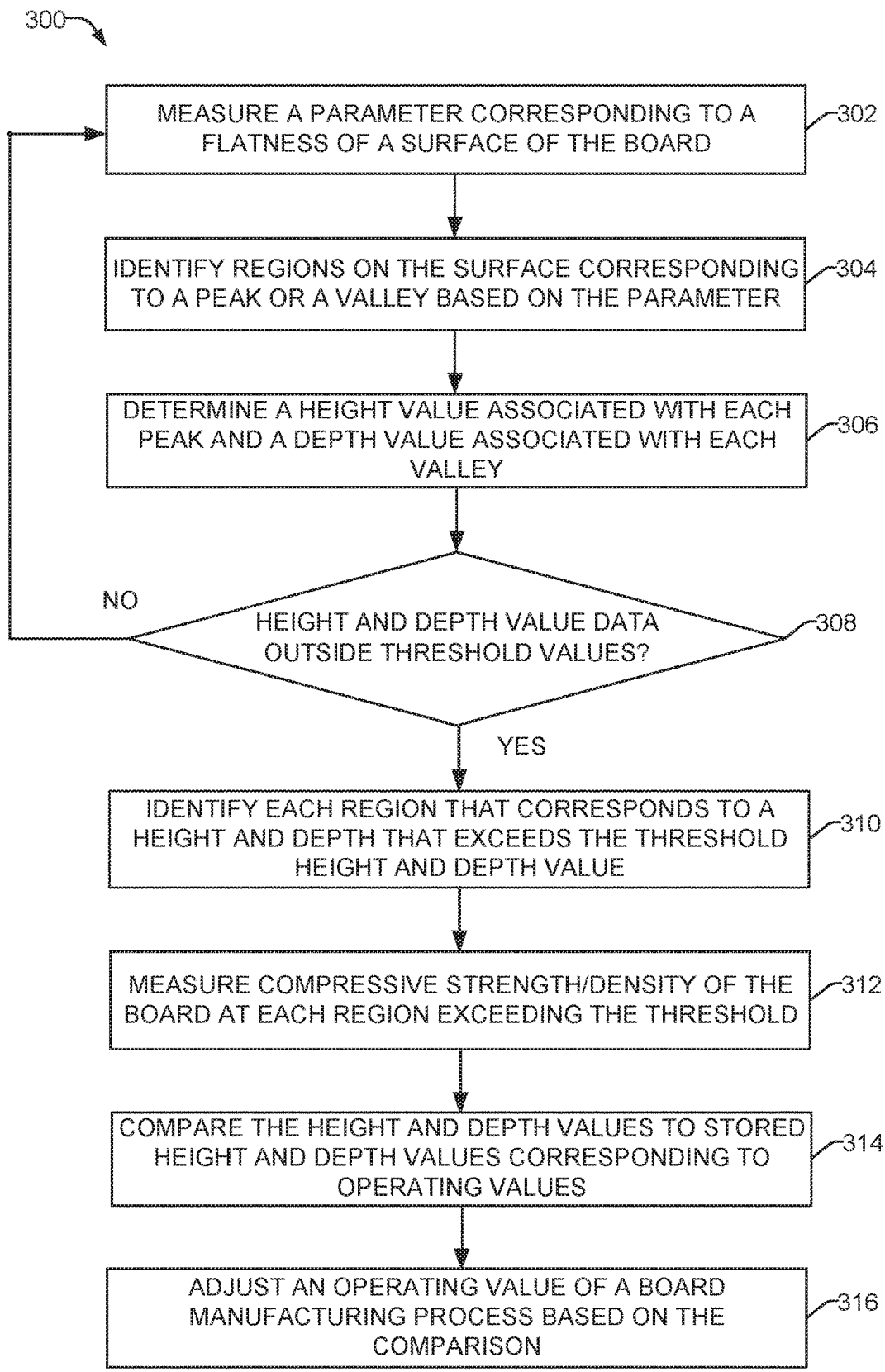
FIG. 3 illustrates an example method of operating a testing system in accordance with aspects of this disclosure.

FIG. 3 is a flowchart representative of example machine readable instructions 300 which may be executed by the controller 110 of FIG. 1 and controller 220 of FIG. 2 to determine the integrity of a manufactured board (e.g., board 110) and adjust an operating value of a manufacturing system (e.g., manufacturing system 232), in accordance with the examples provided in FIGS. 1 and 2. At block 302, a parameter corresponding to a flatness of a surface of the manufactured board is measured by a sensor, such as by sensors 104, 204. At block 304, regions on the surface corresponding to a peak or a valley are identified based on the measured parameter.

At block 306, height values associated with each peak and depth values associated with each valley are determined. At block 308, the determined height and depth values are compared against threshold values to determine the severity of variance in the measured and stored values. If the height and depth values are within an acceptable threshold level, the process returns to block 302 to continue to monitor and measure flatness of this or another board. If the height and depth values are outside an acceptable threshold level, at block 310 each region that corresponds to a height and/or depth that exceeds threshold height and depth values is identified.

At block 312, the compressive strength and/or the density of the board at each region identified as exceeding the threshold is measured. Additionally or alternatively, at block 314, the height and depth values are compared to stored height and depth values corresponding to operating values. At block 316, an operating value of a board manufacturing process is adjusted based on the comparison performed in block 314. In some examples, a score and/or other information is generated to inform a process or operator as to the integrity of the manufactured board.

The present methods and systems may be realized in hardware, software, and/or a combination of hardware and software. Example implementations include an application specific integrated circuit and/or a programmable control circuit.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further, the examples are provided to not be exhaustive but illustrative of several embodiments that fall within the scope of the claims.

The invention claimed is:

1. A testing system for determining the integrity of a manufactured foam board comprising:
    a testing platform configured to secure the manufactured foam board;
    a sensor configured to measure a parameter corresponding to a flatness of a surface of the manufactured foam board; and
    a controller configured to:
        identify regions on the surface corresponding to one of a peak or a valley based on the parameter;
        adjust an operating value of a manufacturing process based on a comparison with a height of the peak and/or a depth of the valley to stored peak heights and/or valley depths corresponding to operating values; and
        calculate a score representing the integrity of the manufactured foam board based on the identified peaks and valleys.

2. The testing system of claim 1, wherein the controller is further configured to determine a height of each peak and a depth of each valley based on the parameter.

3. The testing system of claim 1, further comprising a conveyance system to advance the manufactured foam board along a conveyor path, the sensor being configured to scan the manufactured foam board as it progresses along the conveyor path.

4. The testing system of claim 3, wherein the sensor is configured to scan the manufactured foam board along an axis that is perpendicular to a direction of the conveyor path.

5. The testing system of claim 1, wherein the sensor is secured to a moveable mount, the mount being secured on a plurality of rails to allow the sensor to navigate in a two-dimensional plane corresponding to a surface of the test platform, and a motor to move the sensor in a direction perpendicular to the plane.

6. The testing system of claim 1, further comprising a mechanical tester configured to determine one of a compressive strength and a density of the manufactured foam board at the identified regions.

7. The testing system of claim 1, wherein the testing system is a computer numerical control testing apparatus.

8. The testing system of claim 1, wherein the manufactured foam board comprises a polyurethane or polyisocyanurate foam board.

9. The testing system of claim 1, wherein the operating values comprise one of a flow rate, a pressure, a temperature, and position of a deposited substance.

10. The testing system of claim 1, wherein the sensor comprises an infrared sensor, an ultrasound sensor, or a heat sensor.

11. A method of determining the integrity of a manufactured foam board comprising:
    measuring, by a sensor, a parameter corresponding to a flatness of a surface of the manufactured foam board;
    identifying, at a controller, regions on the surface corresponding to one of a peak or a valley based on the parameter;
    determining, by the controller, a height value associated with the peak and a depth value associated with the valley;
    comparing the height and depth value data to threshold height and depth value data;
    identifying, by the controller, each region that corresponds to a height and depth that exceeds the threshold height and depth value; and
    calculating, by the controller, a score representing the integrity of the manufactured foam board based on the identified peak and/or valley.

12. The method of claim 1, further comprising measuring, by a testing device, one of a compressive strength and a density of the manufactured foam board at each region that includes height and depth values exceeding the threshold height and depth value.

13. The method of claim 11, wherein the parameter comprises a height of a peak and a depth of a valley.

14. The method of claim 13, further comprising:
    comparing the height of a peak and/or the depth of a valley to stored peak heights and/or valley depths corresponding to operating values; and
    adjusting an operating value of a foam board manufacturing process based on the comparison.

15. The method of claim 14, wherein the operating value is one of a flow rate, a pressure, a temperature, and position of a deposited substance.

16. The method of claim 11, wherein the testing system is a computer numerical control testing apparatus.

17. The method of claim 11, wherein measuring further comprises:
    moving the sensor across a plane corresponding to the surface of the manufactured foam board; and
    activating the sensor to measure the parameter.

18. The method of claim 11, wherein the sensor comprises an infrared sensor, an ultrasound sensor, or a heat sensor.

* * * * *